United States Patent [19]
McMahon

[11] Patent Number: 5,383,989
[45] Date of Patent: Jan. 24, 1995

[54] METHOD AND APPARATUS FOR MANUFACTURING RECLOSABLE PLASTIC BAGS UTILIZING PRE-HEATED ZIPPER

[75] Inventor: Michael J. McMahon, Palatine, Ill.

[73] Assignee: Illinois Tool Works, Inc., Glenview, Ill.

[21] Appl. No.: 65,668

[22] Filed: May 21, 1993

[51] Int. Cl.⁶ .................. B31B 1/90; B32B 31/02; B32B 31/12; B32B 31/26
[52] U.S. Cl. .................. 156/66; 156/308.4; 156/322; 493/194; 493/213; 493/214; 493/927
[58] Field of Search .................. 156/66, 308.4, 322, 156/204, 227; 53/412, 451, 455, 133.4, 551, 562; 493/193-194, 213-214, 927

[56] References Cited

U.S. PATENT DOCUMENTS

| 4,909,017 | 3/1990 | McMahon et al. | 156/66 X |
| 4,957,571 | 9/1990 | Cipolla | 156/66 |
| 5,322,579 | 6/1994 | Van Erden | 156/66 |

*Primary Examiner*—Michael W. Ball
*Assistant Examiner*—Adrienne C. Johnstone
*Attorney, Agent, or Firm*—Kane, Dalsimer, Sullivan, Kurucz, Levy, Eisele and Richard

[57] ABSTRACT

A method for manufacturing reclosable plastic bags or packages includes the step of presoftening the complete length of the zipper before it is introduced into the space between two plies of plastic sheet material, which form the sides of the plastic bag or package. The presoftening enables the zipper, which may comprise interlocked male and female profiles, to be fused together and completely flattened when a seal bar clamps thereacross to form a side seal area transverse to the zipper.

5 Claims, 2 Drawing Sheets

METHOD AND APPARATUS FOR MANUFACTURING RECLOSABLE PLASTIC BAGS UTILIZING PRE-HEATED ZIPPER

BACKGROUND OF THE INVENTION

1. Field of the Invention

The present invention relates to the manufacture of plastic bags or packages having at least two plies of thermoplastic sheeting, both plies having closure strips formed or included on their facing inner edges so as to form a zipper-like closure for the openings of the bags or packages made therefrom. The plies may be formed from two separate sheets or from a single sheet folded over.

2. Description of the Prior Art

The present invention relates to improvements in the package-making art and may be practiced, without limitation, in the manufacture of thermoplastic bags and trays of the kind that may be used for various consumer products, but which are particularly useful for food products which must be kept in moisture- and air-tight packages, free from leakage until opened for access to the product contents, which packages are then reclosable by zipper means to protect any remainder of the product therein.

The indicated art is fairly well developed, but nevertheless is still susceptible of improvements contributing to increased efficiency and cost effectiveness.

One problem that still exists in the production of packages from continuous zipper-equipped sheet material is the difficulty in attaining a satisfactory sealing of the bag or package against leakage, where the zipper and area of film engaged by the zipper extends through the side seal areas separating one bag or package from the next.

SUMMARY OF THE INVENTION

The present invention is directed at a method for manufacturing plastic bags or packages representing a solution to the above-mentioned problem in the prior art. In its broadest form, the method comprises the step of softening the entire male and female profile sections of a zipper as the bag or package is being manufactured. The softening is accomplished by feeding the profile sections to a bag or package making machine from a dispenser having an associated guide tube. The dispenser includes an insulated enclosure from which a length of the interlocked male and female profile sections may be fed to the bag or package making machine through the guide tube, which is itself heated. Within the insulated enclosure is a heat source for heating the profile sections to a desired temperature and degree of softness. Preferably, the insulated enclosure includes an accumulator on which a length of the softened profile sections of the zipper may be disposed under little or no longitudinal tension immediately prior to being pulled through the guide tube. This minimizes the extent to which the bag or package making machine will stretch and possibly distort the presoftened profile sections as it pulls them through the guide tube during operation. The amount of profile section on the accumulator may be periodically replenished as it is used during the course of operation of the machine.

The present invention will now be described in more complete detail below with reference frequently being made to the following figure.

DETAILED DESCRIPTION OF THE PREFERRED EMBODIMENT

Figure 1:
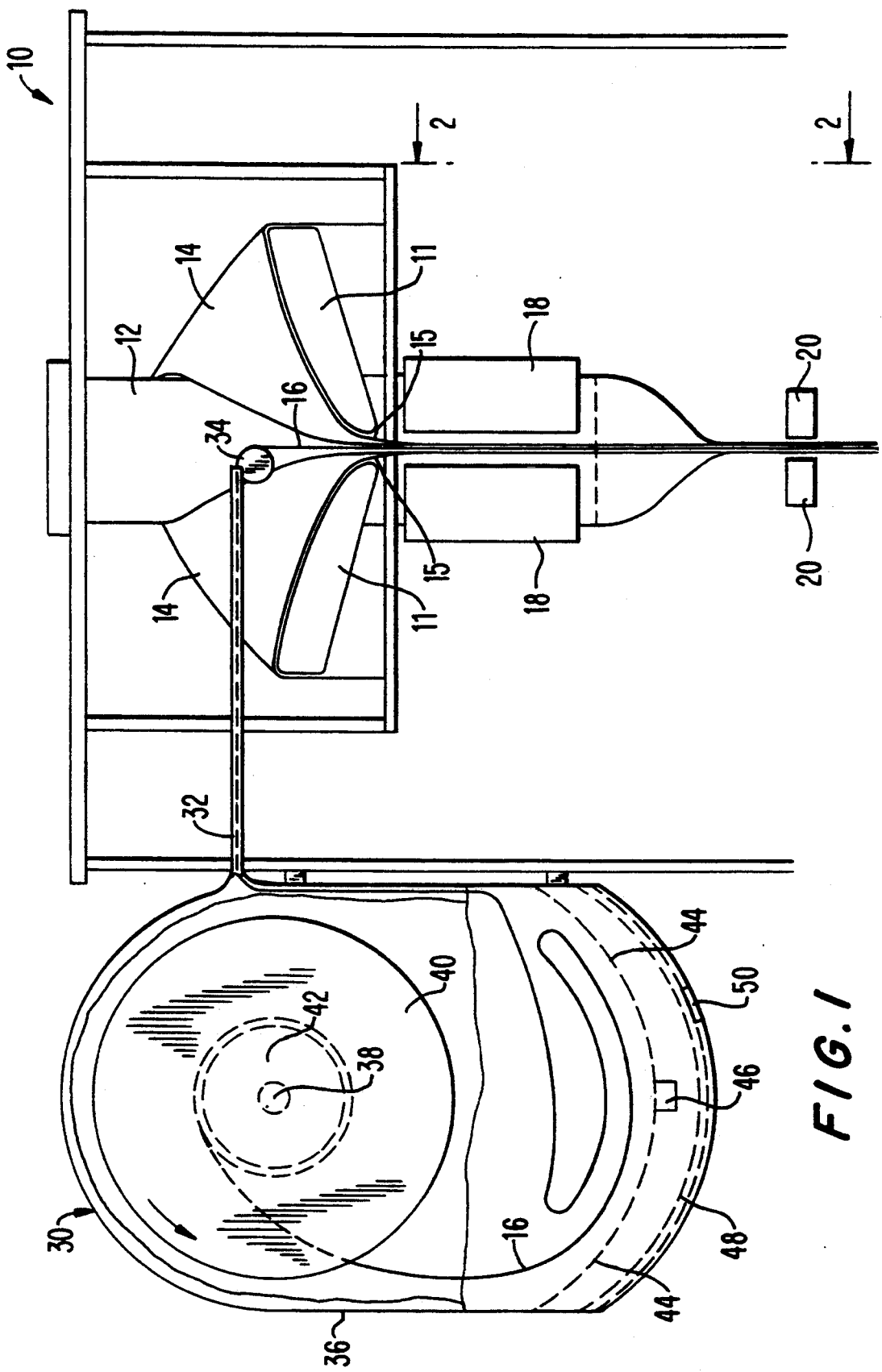
FIG. 1 shows an apparatus with which the present invention may be practiced.

Referring to FIG. 1, which depicts an apparatus 10 used in manufacturing plastic bags or packages, such an apparatus being commonly known as an FFS machine (form, fill and seal machine), the apparatus 10 includes a filling tube 12 and associated forming collar 11. During the operation of the apparatus 10, the forming collar 11 guides plastic sheet material 14 around the filling tube 12 to form a tube of the plastic sheet material 14. The filling tube 12 may, for example, be the filling tube of a conventional vertical form, fill and seal (VFFS) machine, such as that shown in FIG. 1, although it may alternatively be the filling tube on a conventional horizontal form, fill and seal (HFFS) machine. As the tube of plastic sheet material is formed, its lateral edges 15 are brought together so that they may ultimately form the two sides of the opening of a plastic bag or package being manufactured on the machine.

As the two lateral edges 15 are brought together, a pre-heated zipper 16, comprising interlocked male and female profile sections, is continuously fed into the space therebetween. Vertical seal bars 18 operate to weld the zipper 16 to the two lateral edges 15 of the plastic sheet material 14. If desired, the two lateral edges 15 may also be welded to each other outboard of the profile sections during this operation. That is to say, if desired, the vertical seal bars 18, in addition to fusing the zipper 16 to the plastic sheet material 14, may be used to form a seal outboard of the zipper 16 by fusing the lateral edges 15 to each other. Such a seal must first be cut or otherwise ruptured by the consumer to provide access to the zipper 16 for opening the bag. Alternatively, a separate vertical seal bar (not shown) may be provided for joining the lateral edges 15 of the plastic sheet material 14 to one another.

Subsequently, horizontal seal bars 20 operate to clamp completely across the plastic sheet material 14 and zipper 16 to form side seal areas 22 and to separate individual plastic bags 22 or packages from one another in a conventional manner. That the entire zipper 16 has been heated and presoftened facilitates their being fused together in a tight seal by the horizontal seal bars 20.

Figure 2:
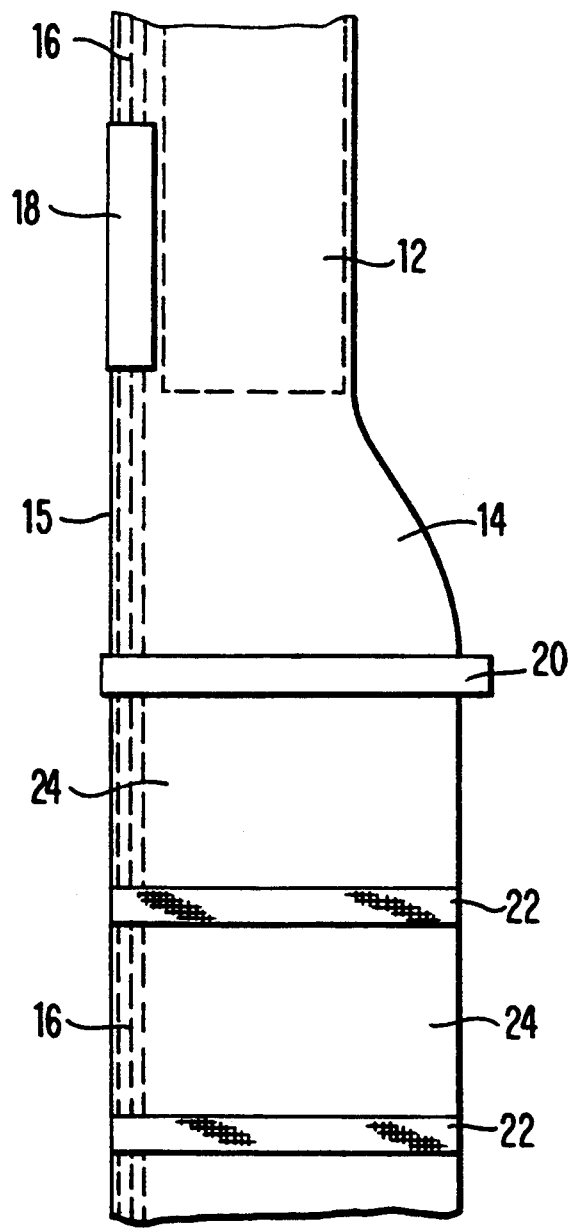
FIG. 2 is a side view of a portion of the apparatus taken as indicated by line 2—2 in FIG. 1.

FIG. 2 is a side view of a portion of the apparatus 10 taken as indicated by line 2—2 in FIG. 1. The filling tube 12 is shown by dashed lines within or behind the plastic sheet material 14. Vertical seal bars 18 weld the zipper 16 to the two lateral edges 15 of the plastic sheet material 14 at a point substantially adjacent to the bottom of the filling tube 12.

Below the bottom of the filling tube 12, the plastic sheet material 14 tends to flatten, as it is no longer maintained in a tube-like form by the filling tube 12. Such flattening is brought about by the action of the horizontal seal bars 20, which clamp completely across the plastic sheet material 14 and zipper 16 to form side seal areas 22 separating individual plastic bags 24 or packages from one another.

In the actual manufacture of plastic bags or packages using apparatus 10, plastic sheet material 14 and zipper 16 are moved incrementally in amounts equal in length to the width of the bags 24 or packages being manufactured. While the plastic sheet material 14 and zipper 16 are at rest, the vertical seal bars 18 and horizontal seal bars 20 operate as described above. In addition, after the horizontal seal bars 20 have operated to form a first side seal area 22, a product, such as food, may be delivered into the region above the side seal area 22 and within the bag 24 or package through the filling tube 12.

It should be observed that each time the plastic sheet material 14 and zipper 16 are so moved incrementally, an additional length of zipper 16 is pulled into position between the converging lateral edges 15 of plastic sheet material 14. Referring back to FIG. 1, the zipper 16 is supplied from a dispenser 30 having a heated guide tube 32. As shown in FIG. 1, the zipper 16 passes over a pulley 34 upon exit from the guide tube 32 and downward toward the point where the lateral edges 15 of plastic sheet material 14 are brought together by the forming collar 11.

Since the FFS machine 10 pulls the zipper 16 from the dispenser 30, it is important that lengths of the zipper 16 be freely fed therefrom without being placed under any undue longitudinal tension. This is particularly important in the present case, where the zipper 16 is heated and presoftened in the dispenser 30 and guide tube 32 and susceptible to being stretched and possibly deformed.

To reduce the likelihood of such stretching, the dispenser 30, in addition to the guide tube 32, further comprises means for providing lengths of zipper 16 from a supply thereof, which supply may be within an insulated enclosure 36. For example, within 35 the insulated enclosure 36, an axle 38 is mounted in a substantially horizontal direction. The axle 38 is provided to hold a coil of continuous plastic zipper 16, perhaps on a spool 40.

A coil feed drive motor 42 is operatively connected to the axle 38, and is operable to rotate the axle 38 so as to unwind lengths of the continuous plastic zipper 16 from the spool 40.

An accumulator 44, which may be a grid-like shelf, is mounted within the insulated enclosure 36 below the axle 38. The accumulator 44 is provided to hold lengths of zipper 16 unwound from the spool 40. The accumulator 44 is also provided with a sensor 46, which is operatively connected to the coil feed drive motor 42. The sensor 46 is provided to detect the absence of any length of zipper 16 on the accumulator 44. When such is the case, the sensor 46 signals the motor 42 to unwind a new length of zipper 16 from the spool 40, and to stop when that new length rests on the accumulator 44. In this manner, the FFS machine 10 will not directly pull the zipper 16 from the spool 40, thereby minimizing the risk of its being stretched by such action in its heated and presoftened condition.

The insulated enclosure 36 also includes a heat source 48 which maintains the interior thereof at a desired elevated temperature to heat and presoften the zipper 16. The heat source 48 may also include a thermostat 50 operatively connected thereto, so that the temperature within the insulated enclosure 36 may be regulated.

It should be understood that the spool 40 may be mounted either horizontally, as shown, or vertically, and may be mounted in either orientation outside of the insulated enclosure 36 in such a manner that it may feed lengths of zipper 16 thereinto when they are required.

Modifications to the above would be obvious to anyone skilled in the art, but would not bring the method so modified beyond the scope of the appended claims. For example, the zipper 16 may be disposed in the plastic sheet at some point other than at its lateral edges so as to provide a tamper-evident barrier outboard of the zipper 16 in the final bags. The tamper-evident barrier would have to be ruptured before the zipper could be opened, and cannot be resealed thereafter.

What is claimed is:

1. A method for manufacturing plastic bags or packages wherein a longitudinally extending continuous plastic zipper having male and female profiles on interior surfaces of the plastic bag or package provides a resealable closure between two plies of plastic sheet material, said plastic sheet plies being welded together with a transverse seal at preselected intervals separated by a distance corresponding to the width of the bags or packages being produced to thereby provide side seals separating said bags or packages, said method comprising the steps of:

providing a substantially tension-free length of continuous plastic zipper having male and female profile sections;

heating said length of plastic zipper to effect a presoftening thereof;

inserting said length of plastic zipper while in a heated state between said two plies of plastic sheet material;

fusing said male profile section of said length of plastic zipper to one of said two plies of plastic sheet material;

fusing said female profile section of said length of plastic zipper to the other of said two plies of plastic sheet material; and making a transverse seal across said two plies of plastic sheet material and through said presoftened length of plastic zipper.

2. The method in accordance with claim 1 further comprising the step of interlocking said male and female profile sections of said continuous plastic zipper before heating said continuous plastic zipper.

3. The method in accordance with claim 1 wherein said heating step is accomplished within a heated insulated enclosure and further comprising the step of guiding said heated zipper toward said two plies of plastic sheet material.

4. The method in accordance with claim 1 wherein said plastic sheet material is folded into a generally tubular shape to provide said two plies of plastic sheet material.

5. The method in accordance with claim 4 further comprising the step of guiding said continuous plastic zipper while in a heated state between the two edges of said two plies of said plastic sheet material.

* * * * *

* * * * *